July 2, 1940.  R. E. ROUSSEAU  2,206,822
AUTOMATIC WINDSHIELD CLEANER
Filed Dec. 9, 1936   3 Sheets-Sheet 1
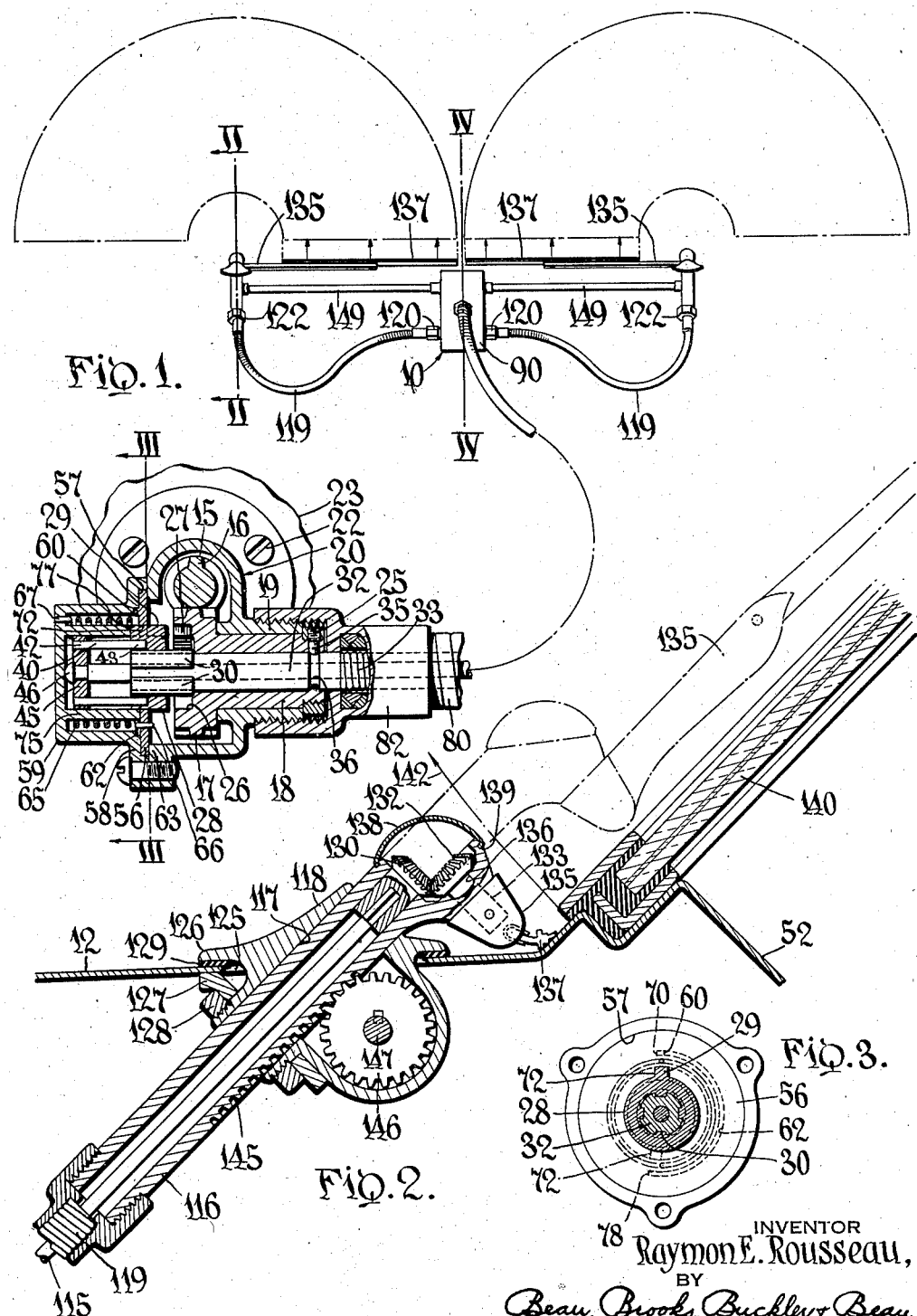
INVENTOR
Raymon E. Rousseau,
BY
Beau, Brooks, Buckley & Beau.
ATTORNEYS

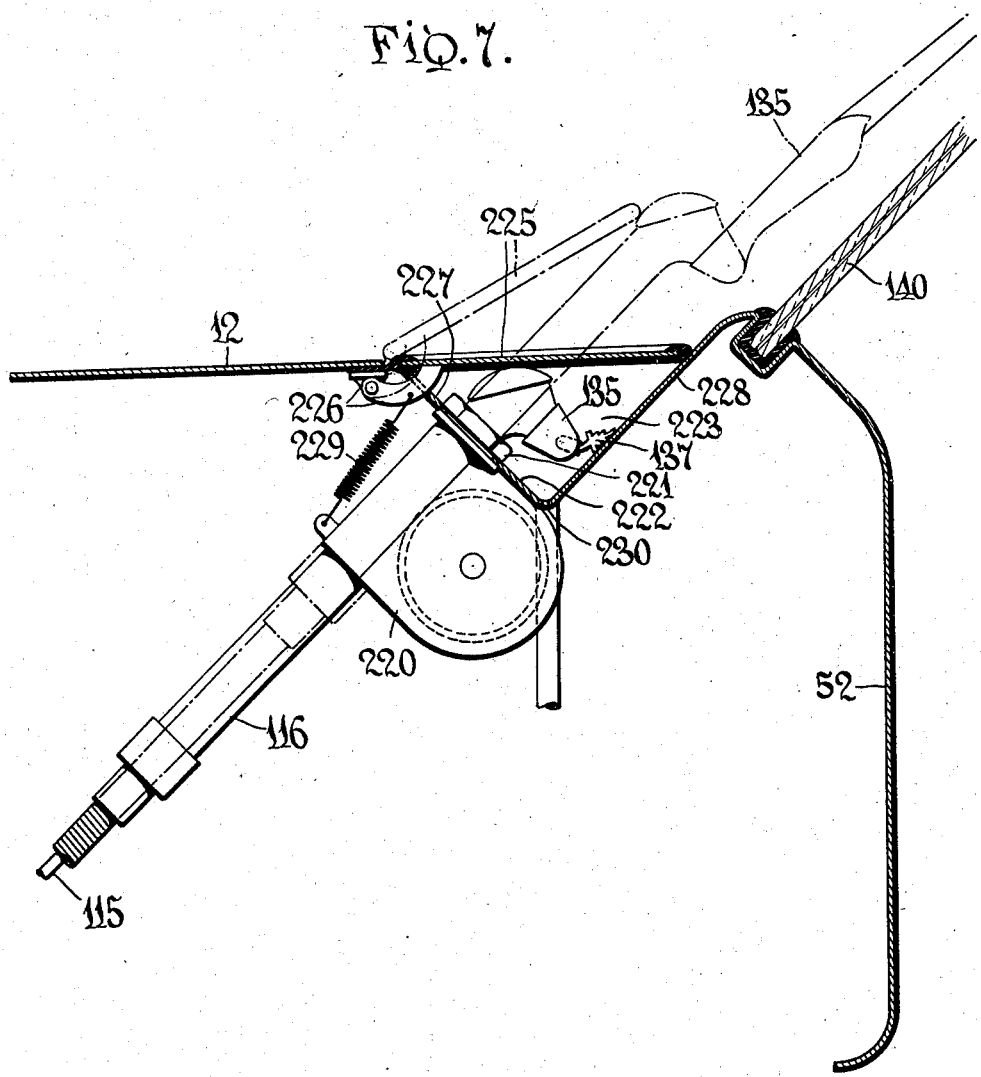

Patented July 2, 1940

2,206,822

UNITED STATES PATENT OFFICE 2,206,822

AUTOMATIC WINDSHIELD CLEANER

Raymon E. Rousseau, Buffalo, N. Y., assignor to Trico Products Corporation, Buffalo, N. Y.

Application December 9, 1936, Serial No. 114,987

20 Claims. (Cl. 15—255)

This invention relates to automatic windshield cleaners and it has particular relation to a mechanism operable through successive phases to position windshield wipers and control their oscillation.

One object of the invention is to provide an improved mechanism for elevating and lowering windshield wipers to permit unobstructed opening of a windshield, or for other purposes.

Another object of the invention is to provide an improved mechanism including devices for oscillating a windshield cleaner and further including elements automatically operable to elevate or lower the wiping members of the cleaner in response to the initiating of the operation of the mechanism.

Another object of the invention is to provide an improved combination of windshield cleaning mechanism and wiper elevating mechanism.

Another object of the invention is to provide a windshield cleaning arrangement adapted to be displaced entirely from the vision of a driver in a vehicle and to be encompassed within the over all surface lines or streamlining of a vehicle.

The invention is exemplified in a windshield cleaner which includes wipers mounted adjacent a windshield, and which are movable into and out of engagement with the windshield to permit hinged opening of the latter. A member is provided which is manually actuatable to initiate operation of the cleaner mechanism in such manner that, as soon as the mechanism is connected in driven relation to a source of power, the wipers will be elevated. As soon as the wipers are elevated they are automatically oscillated until such time as it is desirable to arrest their oscillation. A similar reverse actuation of the member causes the oscillation of the cleaner mechanism to be automatically arrested, and then, automatically operable devices lower the wipers to their original inoperative position. An arrangement of this kind is adapted to be employed in conjunction with recesses or wells disposed below the outline or streamline surfaces of a vehicle in order that air streams will not cause chattering or vibration of the cleaner parts.

In the drawings:

Fig. 1 is a fragmentary and diagrammatic illustration of a windshield cleaner mechanism, a portion thereof being illustrated on a larger scale and in longitudinal section;

Fig. 2 is a vertical section, on a larger scale, taken substantially along the line II—II of Fig. 1, and including portions of a vehicle cowl and windshield;

Fig. 3 is a cross section taken substantially along the line III—III of Fig. 1;

Fig. 7 is a cross section similar to Fig. 2 and illustrating another arrangement for mounting the cleaner mechanism.

Figure 4:
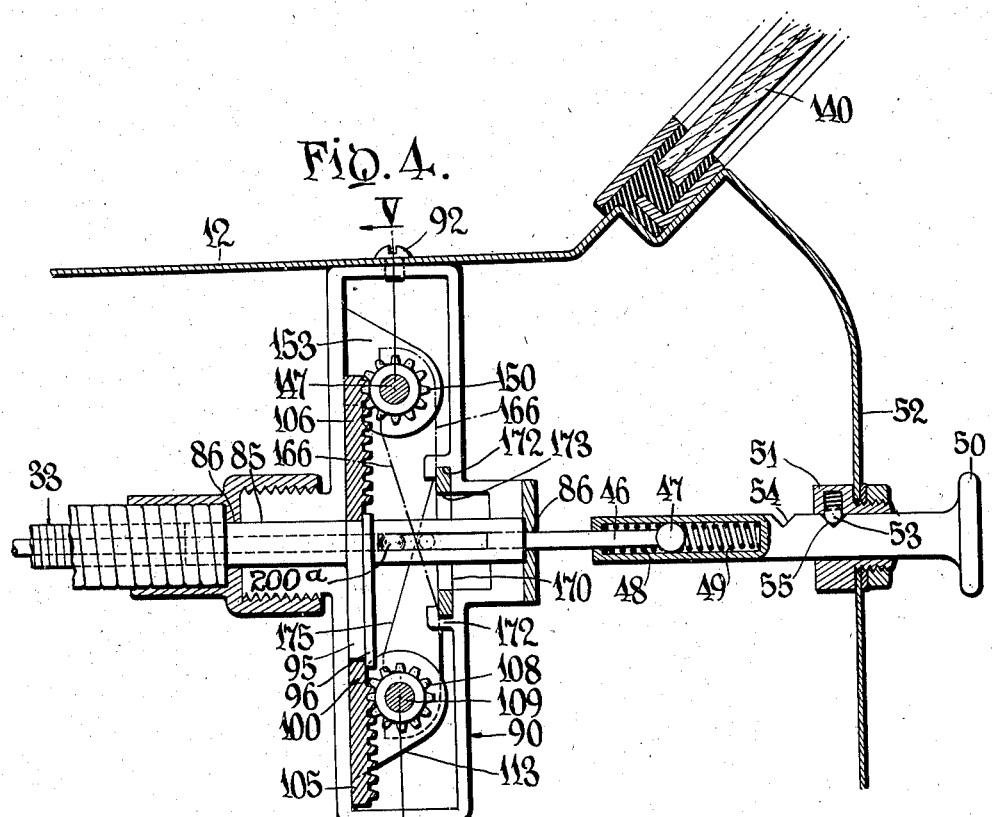
Fig. 4 is a vertical section, on a larger scale, taken substantially along the line IV—IV of Fig. 1.

Referring to Figs. 1 and 2, a windshield cleaning unit 10 is supported upon a cowl 12 of a motor vehicle. A rotatable driving shaft 15 is adapted to be connected to a suitable source of power which can be in the form of a rotating element of a conventional internal combustion engine (not shown) of the type commonly used in propelling a motor vehicle.

A worm 16 formed upon the shaft 15 meshes with a gear 17 carried rigidly upon one end of a sleeve 18 that is rotatable in a bearing boss 19 of a housing 20 that is rigidly supported, as indicated at 22, upon a crank case wall 23 of an engine. The ends of the bearing boss 19 are in substantially abutting relation to one side of the gear 17, and to a collar 25 that is screwthreaded upon the sleeve 18 in order to prevent axial displacement of the gear from its path of rotation.

One end of the great sleeve, which may be a part of the gear itself, is provided with an annular recess 26 having an offset radial recess 27 communicating therewith, and an annular collar 28 having an outwardly projecting radial lug 29 formed rigidly thereon is axially slidable and keyed, as indicated at 30, upon a tubular shaft section 32 that forms a part of a flexible shaft unit 33. A pin 35 threaded through the collar 25 and gear extension or hub 18 projects into an annular groove 36 formed in the shaft section 32 and prevents axial displacement of the latter.

From this description it will be apparent that the collar 28 is movable axially of the sleeve 18 upon the shaft section 32 and forms a driving connection between these members when the lug 29 is inserted into the recess 27.

Spacers or posts 40 have end connections 42 and 43 securing them respectively to the collar 28 and to a plate 45 rigidly carried upon the outer end of a push and pull member in the form of a flexible adjusting rod or wire 46 that is slidable through the tubular flexible shafting unit. A universal or ball connection 47 at the end of the adjusting wire is secured between adjacent ends of aligned springs or spring sections 48 and 49 that are carried in a tubular handle 50. A plug 51 rigidly secured in a flange or dash 52 of the motor vehicle cowl 12 slidably supports the handle 50. It is to be understood that the coil springs 48 and 49 yieldably resist longitudinal movement of the push and pull rod in either direction. A spring pressed detent 53 is provided in the plug 51 and normally is disposed in one of the recesses 54 and 55 formed in the actuating handle 50 to maintain the latter yieldably in various positions of adjustment.

A ring 56 is rotatably carried in an annular recess 57 formed in an annular wall 58 of a substantially cylindrical section 59 of the housing 20, and this recess maintains the ring 56 in axial alignment with the collar 28, as well as in like alignment with the shafting and gear 17. One side of the ring is provided with a dowel or lug 60, that is disposed slidably in an arcuate channel 62 that describes an arc of approximately 180 degrees, or slightly more than 180 degrees, and is formed in the face of the wall 58 against which the ring bears. In assembling the elements of the housing 20, including the section 59 and wall portion 58, an inward shoulder 63 formed on the housing overlaps the outer edge of the ring 56 and prevents the latter from being displaced axially, but does not interfere with rotation of the ring. The body of the ring projects radially inwardly beyond the edges of the supporting casing walls, and a torsion spring 65 has one end connected, as indicated at 66, to the ring and its other end connected, as indicated at 67, to an outer or end wall portion of the cylindrical housing section 59. The torsion spring 65 normally maintains the ring 56 in such position that the dowel 60 bears against an end shoulder 70 of the arcuate groove 62. A notch 72 is formed in the inner edge of the ring 56, and the lug 29 of the collar 28 can be operated into registering relation with this notch. The normal position of the notch 72 during operative engagement of the lug 29 with the gear 17 is indicated by broken lines in Fig. 3.

A cylindrical partition 75 is integrally formed with the outer wall of the cylindrical housing section 59 in such manner as to be coaxial with the latter, and this partition separates the spring 65 from the spacers 40. The inner annular end of the cylindrical partition 75 is axially aligned with the ring 56 and has a notch 77 formed therein. It is, therefore, apparent that the notch 72 can be brought into registering relation with the notch 77 by rotating the ring 56, the dowel 60 of which is normally disposed in a lower end 78 of the arcuate groove 62.

In order to initiate operation of the flexible shafting unit during operation of the gear 17, the push and pull rod 46 is actuated to compress the spring 48, and hence exert force tending to withdraw the lug 29 from the notches 77 and 72. If the recess 27 in the gear does not happen to be registering with these notches and lug 29 at the time the lug 29 is withdrawn from the notch 77, then the inner face of the lug 29 will bear against the opposed face of the gear under the influence of the compressed spring 48 until the gear is rotated to such position that the lug will enter or snap into the recess 27. As soon as the lug 29 is withdrawn from the notch 72, the torsion spring 65 rotates the ring 56 until the dowel 60 is returned and stopped in its normal position in the groove end 70 and the notch 72 is thus rotatively returned approximately 180 degrees to its normal position out of registering relation with the notch 77. The major portion of the compressive force of the spring 48 is substantially expended during movement of the lug 29 into the notch or recess 27, but the spring 48 resists any tendency of the lug to be withdrawn after the rod 46 has been actuated and the lug engaged with the notch.

It should be understood that the body of the ring 56 normally covers the notch 77 and after the lug 29 is actuated to enter the notch 72 the ring and lug must rotate approximately or slightly more than one half of one revolution before the lug can also enter the notch 77. The reasons for this particular mode of operation will appear as the description proceeds.

Upon actuation of the rod 46 in the opposite direction, the opposite spring 49 is placed under compression to draw the collar 28 outwardly, and the lug 29 may first bear against the adjacent surface of the ring 56 at any distance from the notch 72, depending upon the position of the lug, but the latter, while bearing upon such surface will not be released from driving relation to the gear 17; i. e., from the recess 27. When the gear 17 continues rotative movement until the lug 29 registers with the notch 72, such lug enters the latter notch and then bears against the inner end of the cylindrical partition 75 until it registers with the notch 77 in the partition. The spring 49 under compression then forces the lug 29 into the latter notch 77, as well as drawing such lug out of the recess 27, and hence, out of driving engagement with the gear 17. It should be understood that the notches 72 and 77 are not normally disposed in registering relation.

As soon as the lug 29 enters the ring notch 72, the ring is rotated therewith in opposition to the torsional force of the spring 65 until the lug is actuated into registering relation with, and into, the notch 77, at which time the operating connection to the gear 17 is broken and the dowel 60 will have moved to a location adjacent the end 70 of the arcuate groove 62 where it is held so long as the lug 29 remains in engagement with the notch 77.

The tubular flexible shafting unit 33 (Figs. 1 and 4) is enclosed in a flexible sheath 80 which has a connecting socket 82 disposed in screwthreaded engagement upon the bearing boss 19 of the housing 20, and such unit is provided with a rigid end section 85 that is rotatably mounted in bearing openings 86 formed in a sectional casing 90. Suitable fastening means 92 secure the casing 90 upon the cowl 12.

An eccentric or cam 95 is formed rigidly upon the shaft section 85 and has a circumferential flange 96 formed thereon. A yoke 100 having an oblong opening 102 extending therein in a substantially horizontal direction is fitted about the eccentric 95 and is slidably held between the flange 96 and the adjacent housing wall. Opposite extremities of the yoke are prevented from being longitudinally displaced by slidably contacting opposite walls of the casing. The yoke is thus reciprocated vertically in response to rotation of the cam 95 and while there is driving connection from the gear 17 to the flexible shafting.

Opposite sides of the yoke, that is, upper and lower sides thereof, are provided with integral or rigidly connected lower and upper rack arms 105 and 106. The lower rack arm 105 engages a pinion 108 carried rotatably upon a shaft section 109 which is, in turn, rotatably mounted in bearing bosses 110 formed upon opposite casing walls.

Opposite hub portions 112 of the pinion 108 are rotatable in bearing ears 113 formed rigidly upon the inner casing wall and the body of the pinion is disposed between these ears in order to maintain the latter in proper position against axial displacement.

The shaft 109 extends in opposite directions through the casing walls and has driving connections with oppositely disposed flexible shafting sections 115 that are rotatably mounted at their outer ends in tubular windshield cleaner supports 116 carried slidably in inclined guides 117 that are formed in casings 118. Flexible sheaths 119 enclose the flexible shafts 115 and are connected at their opposite ends, as indicated at 120 and 122, to the casing 90 and supports 116, respectively. Each casing 118 is disposed partially above and partially below the vehicle cowl 12 and through an opening 125 formed in the latter. Referring to Fig. 2, it will be apparent that each casing 118 is provided with an upper flange 126 resting upon the upper surface of the vehicle cowl and a lower clamping plate 127 is fitted about the lower part of the casing and is fastened by means of a nut 128 in such manner that the plate and casing are clamped rigidly to the cowl. If desirable, a gasket 129 can be placed between the flange 126 and the cowl 12.

The outer end of each flexible shaft 115 extends through one of the slidable tubular supports 116 and is provided with a bevel gear 130 which meshes with a companion bevel gear 132 rigidly carried upon a shaft 133 that rigidly supports one end of a windshield wiper arm 135. A suitable bearing opening 136 is formed in the upper end portion of each tubular support 116 for rotatably supporting the shaft 133. A wiper blade 137 is articulated to the outer end of each wiper arm in a conventional manner, and a resilient cover plate 138 for protecting the bevel gears is removably mounted in grooves 139 into or out of which the cover edges can be snapped.

It will be observed (Fig. 2) that the inclination of the tubular supports 116 corresponds to the inclination of a vehicle windshield 140 which can be of the type that swings open about an arc indicated at 142. The windshield cleaner supports are movable from a normally inoperative full line position to their operative broken line position shown in Fig. 2. In such inoperative position, the windshield can be opened without interfering with the cleaner structure.

Figure 5:
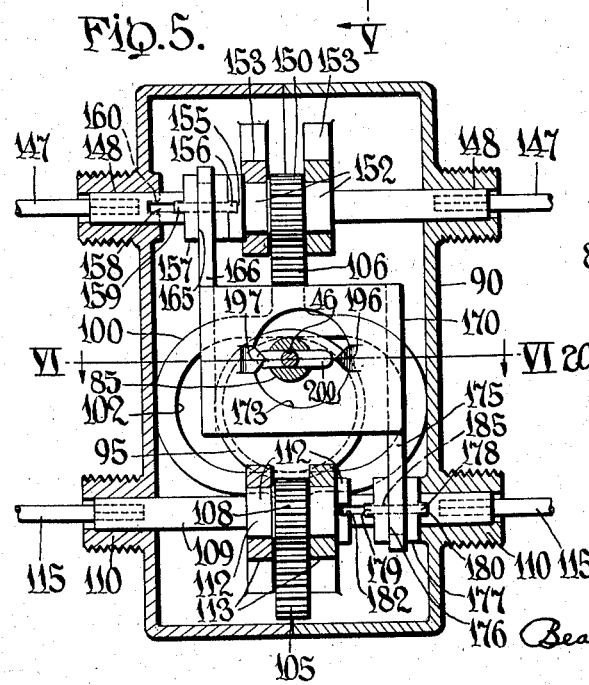
Fig. 5 is a vertical section of a gearing and clutch mechanism taken substantially along the line V—V of Fig. 4.

One side of each tubular support 116 is provided with a rack section 145 which meshes with a pinion 146 carried rigidly upon a shaft 147 that is rotatably mounted in the wall of the casing 118. As best shown in Figs. 1 and 5, the casings 118 are disposed at opposite end portions of the shaft 147 and an intermediate portion of the shaft extends through an upper portion of the housing or casing 90 which is provided with bearing openings 148 for rotatably receiving such shaft. Tubular casings 149 surround the shaft 147 and are connected between opposite sides of the casing 90 and the opposed casings 118.

A gear 150 (Figs. 4 and 5) is rotatably mounted upon the shaft 147 inside the casing 90, and hubs 152 extending on opposite sides of the gear are rotatably supported in bearing ears 153 formed upon the casing walls. The gear 150 is fitted between the ears to prevent axial movement thereof and meshes with the upper rack arm 106 of the yoke 100 in such manner as to be oscillated by the latter.

One end of the gear hub 152 is provided with a clutch socket 155 in which a clutch key 156 can be locked by sliding along the shaft 147 a clutch collar 157 upon which the key is formed. The clutch collar 157 is slidably keyed, as indicated at 158, upon the shaft 147. A second clutch key 159 is formed on the collar 157 in a position opposite the key 156, for locking engagement in a socket 160 formed in a wall portion of the casing adjacent the bearing opening 148 for the shaft 147. Thus it will be apparent that, by engagement of the key 159 in the socket 160, the shaft 147 is locked against rotative movement, while the gear can rotate freely. Likewise, by engagement of the key 156 in the socket 155, rotation of the gear 150 causes like rotation of the shaft 147.

An annular groove 165 formed in the collar 157 is engaged by an arm 166 which has an end portion shaped for partially surrounding the collar 157 in the groove 165 in bearing relation thereto, and is an integral part of a sliding plate 170 slidably mounted with its opposite edges in parallel guides 172 formed in the wall of the casing. It should be understood that the shaft 147 and the guides 172 are parallel, and that the plate 170 is provided with an opening 173 through which the shaft section 85 extends. The opening 173 is sufficiently large to insure considerable shifting of the plate in its guides without contacting the shaft 83 that extends therethrough.

As best shown in Fig. 5, the plate 170 is substantially quadrilateral and the arm 166 is formed rigidly upon the plate body at a location approximately diagonally from and parallel, with respect to a second arm 175. The latter or second arm 175 is also engaged in bearing relation at its outer end in an annular groove 176 formed in a clutch collar 177 that has oppositely disposed keys 178 and 179 which are alternately engageable in sockets 180 and 182, respectively, formed in the wall of the casing 90 and the hub 112 of the pinion 108. The clutch collar 177 is slidably and non-rotatably keyed, as indicated at 185, upon the shaft section 109. When the key 178 engages the socket 180, the shaft section 109 is locked against rotation while the pinion 108 is freely rotatable or oscillatable, and conversely, when the key 179 engages the socket 182, there is a driving connection established between the pinion 108 and the shaft section 109.

It will be apparent that movement of the sliding plate 170 to the right to the position shown in Fig. 5 causes simultaneous locking of the shaft section 109 against rotation and establishing driving connection from the gear 150 to the shaft 147. Conversely, movement of the plate 170 to the left causes the locking of the shaft 147 against rotation and simultaneously establishes driving connection between the pinion 108 and shaft section 109. Thus it will be apparent that there can not be driving connection for oscillatably driving the shafts 115 and 147 simultaneously.

A pair of tension springs 190 and 192 have their inner ends connected, as indicated at 193, to the plate 170 and have their outer ends connected to fastening devices 195 removably mounted in the wall of the casing 90. These springs are movable past their dead center positions during the sliding movement of the plate 170, and hence, they operate to urge the collars 157 and 177 to the right (Fig. 5) after they have been moved to the right, as well as to urge these collars to the left after the plate has been urged to the left.

Figure 6:
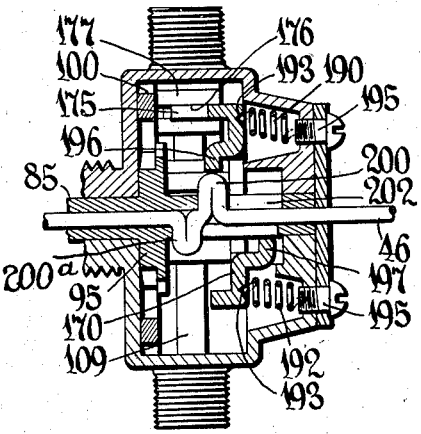
Fig. 6 is a horizontal section taken substantially along the line VI—VI of Fig. 5.

Two oppositely disposed cam fingers 196 and 197 formed in the body of the plate 170 by bending plate portions in opposite directions are spaced on opposite sides of the shaft section 85. A cam actuating projection 200 is formed upon the push and pull rod 46 and extends laterally through a slot 202 formed in the tubular shaft 85. This projection is designed for the purpose of contacting the cam fingers and for shifting the plate 170, and by virtue of its association with the slot 202, the projection provides a keyed relation between the flexible shafting unit 33 and the push and pull rod 46. In the position of elements shown in Figs. 5 and 6, the plate has been shifted to the right (Fig. 5) and the projection 200 will then clear the finger 196 during rotation of the shaft section 85, as well as be out of alignment with reference to the finger 197. By operating the handle 50, the cam projection can be drawn to the right (Fig. 6) until it is aligned with the projection 197 and upon rotation of the shaft 85 one half of one revolution, the projection 200 actuates the cam finger 197 to shift the plate to the left (Fig. 5).

In describing the operation of the mechanism, it is to be assumed, for purposes of convenience, that the windshield cleaner supports 116 and wipers 137 are disposed in their inoperative or full line positions (Figs. 1 and 2) and that the lug 29 of the collar 28 is engaged in the notches 72 and 77. The elements of the structure are so arranged in this relationship that the projection 200 is adjacent, but is free to pass, the cam finger 196, while the keys 156 and 178 on the collars 157 and 177 are disposed in the notches 155 and 180, respectively. Then the operator manipulates the handle 50, pulling it outwardly, or to the right (Fig. 4) and as a result, compresses the spring 48. If the recess 27 in the gear 17 is not at that particular moment registering with the lug 29, the latter merely bears against the face of the gear 17, without establishing driving connection, but is not released from the notch or recess 72 until the lug slips into the recess 27. Then a driving connection is established from the gear 17 to the flexible shafting unit 33 which also rotates the push and pull rod or wire 46.

During the first one half revolution of the shafting 33, the gears 150 and 146 are actuated to slide the windshield cleaner supports 116 upwardly to the broken line position (Fig. 2), and concurrently with the completion of this actuation, the projection 200 strikes the cam finger 197 to actuate the plate 170 to the left (Fig. 5) to its opposite extreme position, aided by the springs 192 after passing their dead center positions. This actuation also concurrently causes the clutch collar 157 to lock the shaft 147, and hence, each cleaner support 116 is locked in its elevated position. Likewise, the clutch collar 177, in the same operation, unlocks the shaft section 109 and provides a driving engagement from the pinion 108 to the shaft section 109 to establish driving connection for oscillating the windshield wipers 137.

In order to arrest operation of the mechanism, the wiper declutching and lowering operations just described are reversed. The handle 50 is pushed inwardly to compress the spring 49 and to move the oppositely extending projection 200a toward, but not to, the position shown in Fig. 6. However, it is desirable that the elements, at the time their operation is arrested, should assume the same relative position as they had at the beginning, or illustrated by the full line position of the elements (Figs. 1 and 2). The position of the lug 29 of the collar 28 at the time of the actuation of the handle 50 is such that the lug 29 is moved into abutting relation against the surface of the ring 56 under the influence of the compressed spring 49.

At this stage of the operation, the lug 29 is still engaged in the recess 27 and driving connection has not yet been broken. Rotation of the shafting unit 33 will continue until the lug 29 registers with and enters the notch 72 of the rotatable ring 56, and the lug 29 will then move into the latter notch into abutting relation against the end surface of the cylindrical partition 75, but such lug will not yet have been disengaged from the recess 27 of the driving gear. Since the gear 17 is still being driven during this movement, the spiral torsion spring 65 will be wound up to the extent of having one end moved through an arc of approximately 180 degrees while the other end is held stationary. However, at the last designated position of the elements; that is, as the lug 29 enters the notch 72, the projection 200a will then have been moved immediately adjacent the cam finger 196 and in such position that the latter is in the path of movement of the projection 200.

It will be observed that the notch 72 is so positioned with respect to the notch 77 that approximately one-half of one revolution of the shafting 33 and rotatable ring 56 is required after the lug 29 enters the notch 72 before these notches register. At the beginning of this one-half of one revolution, the projection 200a strikes the cam finger 196 and shifts the plate 170 to the right (Fig. 5) to disengage the clutch collar 177 from the pinion 108 and concurrently to engage the clutch collar 157 in driving relation with the pinion 150. Also, at the beginning of this one-half of one revolution the windshield wipers 137 are in their full line position; i. e., substantially horizontally disposed, and their oscillation is arrested in this position as the clutch collar 177 is disengaged from the pinion 108.

Since the movable notch 72, before engagement of the lug 29 therewith, is approximately 180 degrees from the stationary notch 77, the rack arm 106, at that time, is in an upper or elevated position. Hence, during this one-half of one revolution of the shafting 33, the pinion 150 is operated in such direction as to lower the cleaner supports 116 from their operating position. At the completion of such one-half of one revolution, the lug 29 is brought into registration with and enters the stationary notch 77, is disengaged from the recess 27 of the driving gear, and hence, the operation of the mechanism is arrested, as well as being disposed in proper relation for repetition of the operations specified upon actuation of the handle 50 in the manner previously described.

It should be understood that, upon withdrawal of the lug 29 from the notch 72, the ring 56 is rotated by action of the torsion spring 65 approximately 180 degrees, or slightly more, and the notch 77 is thus covered. Hence, it is impossible for the lug 29 to enter the notch 77 without first entering the notch 72, and then being moved arcuately through approximately 180 degrees.

The operation of the gear 17 should be continuous so long as the vehicle engine is running in order to operate the parts in the manner described, and it is apparent that the cessation of operation of the vehicle engine automatically causes cessation of the operation of the windshield cleaner, regardless of the position of the elements thereof. Hence, the windshield cleaner mechanism should be actuated to an inoperative or lowered position before stopping the engine.

In the arrangement shown in Fig. 7, each movable support 116 is slidably mounted in a casing 220 in the same manner as such slidable support previously described is mounted in the casing 118. The casing 220 is secured by means of a headed plug or sleeve 221 through which the support extends and which is screwthreaded into the casing to clamp the latter to a downwardly inclined wall section 222 of a well or depression 223. A cover 225 is secured by means of hinge members 226 disposed normally underneath, and supported upon, the lower side of the cowl 12, and the wall section 222 is slotted, as indicated at 227, to permit proper operation of hinge members therethrough.

In the closed position of the cover 225 its upper surface is disposed substantially flush with the upper surface of the cowl and appears as a continuation thereof, while completely obscuring the windshield wiping elements 135 and 137. The edge of the cover 225 opposite the hinged portion normally rests upon a wall section 228 adjacent the lower portion of the windshield 140, and a suitable tension spring 229 connected to the casing 220 and cover 225 is arranged under tension for constantly urging the cover toward its closed position.

Each support 116 is raised and lowered in the same manner as previously described. In the upward movement of the support 116, the cover 225 is forced upwardly to the position shown in broken lines of Fig. 7, and the wipers are then raised and exposed in their operative position. The wall sections 222 and 228 converge downwardly and are provided with suitable drain opening 230.

Although structure for comprehensively illustrating the invention has been shown and described in detail, it will be apparent to those skilled in the art that the invention is not so limited, but that various changes can be made therein without departing from the spirit of the invention or from the scope of the appended claims.

I claim:

1. In a windshield cleaning apparatus, a support movable between predetermined limits, means for guiding said support in its movement, a wiper oscillatably carried upon said support, a transmission, a first driving connection for establishing driving engagement between the support and transmission, a second driving connection for establishing driving engagement between said wiper and transmission, driving means connected to said transmission, a first clutching device in the transmission alternately movable to lock said first driving connection and to establish driving relation to said support, a second clutching device in said transmission and being movable in unison with the first clutching device for alternately locking said second driving connection and establishing driving relation with said wiper.

2. In a motor vehicle having a cowl and a windshield with the lower edge of the latter opening outwardly over the cowl, a wiper for the windshield, a shaft operatively supporting the wiper in advance of the windshield, a support movably carried on the cowl and adjustably mounting the shaft for movement to and from a position in the path of opening movement of the lower edge of the windshield, means for operating the wiper, and means for arresting the wiper operating means, and means for actuating the support to dispose the wiper and shaft out of the path of opening movement of the lower edge of the windshield whereby the latter may be opened and closed without obstruction by the wiper or its shaft.

3. In a motor vehicle having a cowl and a windshield with the lower edge of the latter opening outwardly over the cowl, a wiper for the windshield, a shaft operatively supporting the wiper in advance of the windshield, a bearing support movably carried on the cowl and adjustably mounting the shaft for movement to and from a position in the path of opening movement of the lower edge of the windshield, means for operating the wiper, and means connected to said bearing support and operable for adjusting the same to dispose the shaft and its wiper out of the path of the windshield to permit opening of the latter.

4. A windshield cleaning device comprising an arm and wiper unit adapted to be oscillated across the surface of a windshield, a support carrying said unit and movable bodily into a stationary operative position or into a stationary inoperative position, driving means connected to said unit to oscillate the latter on said support in the stationary operative position thereof, and mechanism incorporated with the driving means and responsive to operation of the latter for actuating said support between operative and inoperative stationary positions.

5. A windshield cleaning device comprising an arm and wiper unit adapted to be oscillated across the surface of a windshield, a unit carrier supporting said unit oscillatably relative thereto and movable bodily to a stationary operative position or to a stationary inoperative position, means movably supporting said carrier, driving means associated with said unit for oscillating the latter and including mechanism responsive to operation of the driving means for moving the carrier from a stationary operative position to a stationary inoperative position, and means connecting said driving means to the carrier.

6. A windshield cleaning device comprising an arm and wiper unit adapted to be oscillated across the surface of a windshield, a movable support having said unit mounted oscillatably relative thereto, unit oscillating mechanism connected to said unit, support shifting mechanism connected to the support for bodily moving the latter, driving means connected to said unit oscillating mechanism and to the support shifting mechanism, and connections associated with said mechanisms automatically rendering one mechanism inoperative while the other mechanism is operative.

7. A windshield cleaning apparatus comprising a device bodily movable into and out of proximity of a windshield, a driven arm and wiper unit oscillatably connected to said device and oscillatable relative to said device across the surface of the windshield, means for supporting said device in a predetermined path of movement, and driven gearing connected to said device for actuating the latter in its predetermined path of movement.

8. A windshield cleaning apparatus comprising a device bodily movable into and out of proximity of a windshield, a driven arm and wiper unit oscillatably connected to said device and oscillatable relative to said device across the surface of the windshield, means for supporting said device in a predetermined path of movement into and out of proximity of the windshield, a cover movable with said device and adapted to conceal the latter and the unit after said device is moved out of proximity of the windshield, and means connected to said device for actuating the latter in its predetermined path of movement.

9. A windshield cleaning apparatus comprising a device bodily movable into and out of proximity to a windshield, an arm and wiper unit oscillatably connected to said device and oscillatable relative to said device across the surface of the windshield, means for supporting said device in a predetermined path of movement into and out of proximity to the windshield, means connected to said device for selectively locking the latter at predetermined positions in its path of movement, means connected to said device for actuating the latter in its predetermined path of movement, and means connected to said unit for oscillating it.

10. A windshield cleaning apparatus comprising a device bodily movable into and out of proximity of a windshield, an arm and wiper unit oscillatably connected to said device and oscillatable relative to said device across the surface of the windshield, means for supporting said device in a predetermined path of movement into and out of proximity of the windshield, locking means connectible to said device for locking the latter at a predetermined position in its path of movement, and driven means including mechanism releasably connectible with said unit for oscillating the latter, said driven means including control means cooperable with the locking means to operate the latter and cooperable with said unit to establish or disestablish operative connection from the driven means to said unit.

11. A windshield cleaning apparatus comprising an arm and wiper unit adapted to be oscillated across the surface of a windshield, a movable support having the unit oscillatably carried thereon, unit oscillating mechanism connected to said unit, support shifting mechanism connected to the support for bodily moving the latter, an adapter having connections for engaging both mechanisms and in a substantially continuous action being movable into operative engagement with the unit oscillating mechanism and out of engagement with said support shifting mechanism whereby only one of said mechanisms can be operated at one time, and driving means connected to said adapter.

12. A windshield cleaning apparatus comprising an arm and wiper unit adapted to be oscillated across the surface of a windshield, a stationary guide supported adjacent the windshield, means slidably supported in said guide and carrying said unit oscillatably thereon, driven means connectible to said unit for oscillating it, and locking means releasably engageable with the slidable means to hold the latter in a stationary operative position, said driven means including control means responsive to operation of said driven means for actuating the locking means into locked relation with said slidable means and maintaining locked relation while said unit is oscillating.

13. In a windshield cleaning apparatus, an arm and wiper unit adapted to be oscillated across the surface of a windshield, a movable support having said unit carried thereon and oscillatable relative thereto, unit oscillating mechanism, support shifting mechanism for bodily moving the support, driving means releasably engageable with both mechanisms and including control means for engaging said driving means with one mechanism and disengaging said driving means from the other mechanism, said control means having operative connections between both mechanisms.

14. In a windshield cleaning apparatus, an arm and wiper unit adapted to be oscillated across the surface of a windshield, a movable support having said unit carried thereon and oscillatable relative thereto, means bodily carrying the support in movable relation, unit oscillating mechanism connected to the unit for oscillating the latter, support shifting mechanism connected to said support for bodily moving the latter, driving means including disengageable driving connections operatively associating the driving means and both of said mechanisms, and a control device releasably coupled with the driving means selectively movable into coacting relation with said mechanisms for engaging and disengaging the driving means with said mechanisms.

15. In a motor vehicle having a windshield therein, a guide, a cleaner support slidably movable in said guide into and out of position in front of the windshield, a driven arm and wiper unit oscillatably mounted upon the support, and means connected to the cleaner support for actuating the latter into and out of position in front of the windshield.

16. In a motor vehicle having a windshield therein, a cleaner support movable into and out of position in front of the windshield, an arm and wiper unit oscillatably mounted upon said support, said vehicle having a recessed portion into and out of which the support with its arm and wiper unit is movable in its movement out of and into position in front of the windshield, means connected to the support for actuating the latter into and out of position in front of the windshield, and means connected to said unit for oscillating the latter upon the support and across the windshield while the support is in front of the windshield.

17. In a motor vehicle having a windshield therein, a cleaner support movable into and out of position in front of the windshield, an arm and wiper unit oscillatably mounted upon said support, said vehicle having a recessed portion into and out of which the support with its arm and wiper unit is movable in its movement out of and into position in front of the windshield, a closure on said vehicle responsive to movement of said support to open and close said recessed portion whereby the support with its arm and wiper unit can be covered or uncovered depending upon its position, means connected to the windshield support for actuating the latter into and out of position in front of the windshield, and means connected to said unit for oscillating the latter upon the support and across the windshield while the support is in front of the windshield.

18. A windshield cleaning apparatus comprising a stationary guide having means supporting it adjacent a windshield, a carrier slidably supported in said guide, an arm and wiper unit oscillatably supported on said carrier and oscillatable relative to said carrier across the surface of the windshield, driven means including oscillatable mechanism operably connectible to said unit, and carrier actuating means connectible to said driven means and carrier.

19. In a windshield cleaning apparatus, shafting having a sleeve rotatably carried thereon, said sleeve having a gear portion and a recessed portion, a ring having a recess therein, means rotatably supporting the ring substantially coaxially of said sleeve and having stops to limit rotation of the ring in opposite directions, an annular abutment having a recess therein and disposed substantially coaxially of said sleeve, said recesses being registerable in response to rotation of said ring and said sleeve, resilient means connected to the ring and constantly tending to rotate the latter to a position whereby said recesses are normally maintained out of registering relation, a coupling member slidably keyed on said shafting and movable into engagement with said recesses and out of engagement with the recessed portion of said sleeve, said coupling member being concurrently engageable with said recessed portion of the sleeve and the recess in said ring and also movable out of engagement with the sleeve upon engaging the recess in said abutment, driving means connected to the gear portion of the sleeve, an oscillating device connected to said shafting and providing oscillatory mechanical movement adapted to operate a windshield wiper, a shifting device connected to said shafting and providing shiftable mechanical movement adapted to bodily shift the position of the windshield wiper, and control mechanism operatively associated with said coupling member and with said devices for selectively establishing driving connections from said shafting to the two devices, said control mechanism including means disengaging one of said devices from driving connection with the shafting and actuating said coupling member out of engagement with the recessed portion of the sleeve into engagement with said recesses of the ring and abutment in response to the establishing of driving connection of the other device with the shafting.

20. In a motor vehicle having a windshield and a forwardly extending cowl provided with a recessed portion, a cleaner support movable into and out of the recessed portion, an arm and a wiper unit oscillatably mounted upon said support and movable therewith into and out of the recessed portion from and to a position in front of the windshield, means connected to the support for actuating the latter into and out of the recessed portion, means connected to said unit for oscillating the latter upon the support and across the windshield when out of the recessed portion, and a cover arranged to conceal the unit and said support when withdrawn into the recessed portion.

RAYMON E. ROUSSEAU.